United States Patent
Hsieh (10) Patent No.: US 7,665,892 B2
(45) Date of Patent: Feb. 23, 2010

(54) INFRARED THERMOMETER

(75) Inventor: Chih-Wei Hsieh, Hsinchu County (TW)

(73) Assignee: Actherm Inc., Hsin-Chu (TW)

( * ) Notice: Subject to any disclaimer, the term of this patent is extended or adjusted under 35 U.S.C. 154(b) by 272 days.

(21) Appl. No.: 11/812,020

(22) Filed: Jun. 14, 2007

(65) Prior Publication Data

US 2008/0267254 A1     Oct. 30, 2008

(30) Foreign Application Priority Data

Apr. 27, 2007     (CN) ................................ 96 1 15038

(51) Int. Cl.
   *G01J 5/02*     (2006.01)
   *G01K 1/02*     (2006.01)
(52) U.S. Cl. .................. 374/121; 374/141; 374/549
(58) Field of Classification Search ............. 374/120, 374/121, 29, 43–44, 30, 137, 163, 183, 129, 374/208, 170, 141; 600/549, 474; 73/866.5
See application file for complete search history.

(56) References Cited

U.S. PATENT DOCUMENTS

| | | | |
|---|---|---|---|
| 4,191,197 A * | 3/1980 | Benzinger ................. 600/549 |
| 4,301,682 A | 11/1981 | Everest | |
| 4,386,733 A | 6/1983 | Bradshaw | |
| 4,659,234 A | 4/1987 | Brouwer et al. | |
| 4,722,612 A | 2/1988 | Junkert et al. | |
| 4,737,038 A | 4/1988 | Dostoomian | |
| 4,791,585 A | 12/1988 | Maki et al. | |
| 4,797,840 A | 1/1989 | Fraden | |
| 4,854,730 A | 8/1989 | Fraden | |
| 4,895,164 A | 1/1990 | Wood | |
| 4,900,162 A * | 2/1990 | Beckman et al. ............. 374/132 |
| 4,907,895 A | 3/1990 | Everest | |
| 5,017,018 A * | 5/1991 | Iuchi et al. ................. 374/130 |
| 5,018,872 A | 5/1991 | Suszynski et al. | |
| 5,167,235 A * | 12/1992 | Seacord et al. ............. 600/474 |
| 5,293,877 A | 3/1994 | O'Hara et al. | |
| RE34,789 E | 11/1994 | Fraden | |
| 5,860,741 A | 1/1999 | Tsao et al. | |
| 5,874,736 A | 2/1999 | Pompei | |
| 5,893,833 A | 4/1999 | Pompei et al. | |
| 6,001,066 A | 12/1999 | Canfield et al. | |
| 6,048,092 A | 4/2000 | Kimura et al. | |
| 6,076,962 A | 6/2000 | Chen | |
| 6,109,782 A | 8/2000 | Fukura et al. | |
| 6,152,595 A | 11/2000 | Beerwerth et al. | |
| 6,155,712 A | 12/2000 | Egawa | |
| 6,241,384 B1 | 6/2001 | Pompei et al. | |
| 6,367,973 B2 * | 4/2002 | Yamaka .................... 374/158 |
| 6,435,711 B1 | 8/2002 | Gerlitz | |

(Continued)

FOREIGN PATENT DOCUMENTS

JP     2002214046 A  *  7/2002

*Primary Examiner*—Gail Verbitsky
(74) *Attorney, Agent, or Firm*—Ming Chow; Sinorica, LLC (57) ABSTRACT

This invention discloses an infrared thermometer for ear or skin temperature. The infrared thermometer comprises a body, an infrared sensing element, and a heat dissipating means. The heat dissipation means is provided behind or below the infrared sensing element for urging the air flowing in and out of the body, so as to contribute better heat dissipation and air circulation around the infrared sensing element. Hence the accuracy and stability of the infrared thermometer are improved.

12 Claims, 6 Drawing Sheets

U.S. PATENT DOCUMENTS

| | | |
|---|---|---|
| 6,547,744 B1 | 4/2003 | Pompei et al. |
| 6,626,835 B1 * | 9/2003 | Kraus ......................... 600/454 |
| 6,632,016 B2 | 10/2003 | Chen et al. |
| 6,637,931 B2 | 10/2003 | Lee et al. |
| 6,659,639 B2 | 12/2003 | Hollander et al. |
| 6,694,174 B2 | 2/2004 | Kraus et al. |
| 6,811,306 B2 | 11/2004 | Gerlitz |
| 7,014,358 B2 | 3/2006 | Kraus et al. |
| 7,108,419 B2 | 9/2006 | Harr |
| 2005/0085733 A1 * | 4/2005 | Wong ......................... 600/474 |

* cited by examiner

INFRARED THERMOMETER

BACKGROUND OF THE INVENTION

1. Technical Field

This invention discloses a device for measuring temperature, and more particularly, refers to a device that uses an infrared sensor to measure temperature.

2. Description of Related Art

Mercury-in-glass thermometers and electronic thermometers are popularly used for measuring body temperature. A mercury-in-glass thermometer functions based on the principle of conductive thermal equilibrium and therefore requires more time for measuring temperature. Since mercury is pollutant and seriously harmful to human bodies, it has been gradually eliminated from the market in recent years. On the other hand, as an electronic thermometer determines the final temperature reading at thermal equilibrium by acquiring a minimum temperature variation during a period of time which is shorter than the measuring time of a mercury-in-glass thermometer, a certain level of inaccuracy of the reading is unavoidable. Besides, an electronic thermometer requires complex and complicated disinfection process after use, so as to be reapplied without hygiene concern. Further, an electronic thermometer has relatively stricter requirements regarding to electric circuits while it requires an inconvenient stability check for measurement circuit. In addition to its relatively lower precision, the electronic thermometer may be clumsy in measuring temperature when pool connection of its sensor circuits occurs. Hence, infrared ear thermometers have been developed to meet the need for a device and a method that remedy the aforesaid disadvantages of the traditional thermometers by taking temperature accurately, promptly, harmlessly and more ergonomically.

A conventionally used infrared ear thermometer is capable of receiving the infrared rays emitted by a radiant heat energy source and computing the temperature readings in a very short period of time by implementing an infrared sensor, so as to remedy the aforesaid disadvantages of traditional mercury-in-glass thermometers. On the other hand, the internal structure of human ears facilitates the acquirement of the thermal radiation that the human ears emit. Thus, it is convenient and efficient to take ear temperature in a very short period of time by easily putting a probe of the infrared ear thermometer in a human ear canal and pressing a start button. Therefore, it is expectable that the proliferation and application rates of infrared ear thermometers will become higher and higher, especially at the use of taking temperature for children and for patients appearing in the emergency departments.

However, the aforementioned conventional infrared ear thermometer still has some drawbacks. A conventional infrared ear thermometer has its measuring end equipped with an infrared sensor that is capable of taking temperature in a contact or non-contact way. The fundamental principle upon which an infrared ear thermometer is based is that the infrared sensor thereof introduces the infrared radiation generated by the heat of the object to be measured to a thermopile sensor settled in a temperature sensing element thereof. Then the thermopile sensor conducts comparison and conversion of the temperature difference between the cold and hot junctions in the temperature sensing element for outputting the resultant value in the form of numeral reading. Therein, the temperature at the hot junction is caused by the infrared radiation generated by the heat of the object to be measured while the temperature at the cold junction is reflection of the temperature of the thermopile sensor itself. A typical method for obtaining the temperature at the cold junction is to take the temperature of a metal cap at the area around the thermopile sensor by means of a thermistor. However, when such an infrared ear thermometer is put into clinical practice, the thermopile sensor is subject to the interference of the body temperature around the human ear canal. Deviation between the temperatures at the cold junction and the metal cap may happen due to different heat conduction speeds of the different materials. As a result, the accuracy of temperature measurement can be desirably affected. In an attempt to remedy this problem, Taiwan Patent TW485239 and Early-Published Taiwan Patent Application TW200605844 have been developed and both implement infrared sensors wrapped by metal blocks that help to absorb allochthonous heat and conduct partial heat dissipation. The aforementioned heat dissipation works under the fundamental principle of the physical phenomenon that the metal blocks possess relatively lower specific heat and relatively higher specific heat capacity. Thereupon, when the probe of the infrared ear thermometer approaches a human ear canal, the human body heat can be promptly dissipated. Nevertheless, such a prior-art heat dissipation means that ensures the constant temperature of the infrared sensor against interference can only work efficiently for a short period of use of the infrared ear thermometer. In the case that the infrared ear thermometer is continuously used, since the human body heat accumulated in the metal blocks cannot be dissipated, it eventually affects the constant temperature of the infrared sensor, and, as a result, the degenerate accuracy of temperature measurement is caused. In view of this, a need exits for a means that can dissipate the heat that may affect the infrared sensor and assure the temperature constant of the infrared sensor as well as the area thereabout so that accurate and effective temperature measurement can be achieved by using such means.

SUMMARY OF THE INVENTION

The present invention is provided in the aforementioned circumstances and aims at providing a novel and improved infrared thermometer for measuring ear or skin temperature. The disclosed infrared thermometer primarily comprises a body, an infrared sensor and a heat dissipation means. Further, the body comprises a housing, a display, a power switch, a control circuit, a first opening and a second opening. The infrared sensor is settled inside the body and near the first opening. The heat dissipation means is settled inside the body and near the second opening while it functions for urging the air flowing in and out of the body, so as to contribute air circulation.

Thus, it is one objective of the present invention to provide an infrared thermometer for ear or skin temperature that implements the heat dissipation means to cool the infrared sensor, so as to provide relatively more accurate temperature measurement.

It is another objective of the present invention to provide an infrared thermometer for ear or skin temperature that implements the heat dissipation means to cool the infrared sensor, so as to permit of temperature measurement with improved stability and less deviation during continuous use.

It is yet another objective of the present invention to provide a method for manufacturing an infrared thermometer for ear or skin temperature that implements the heat dissipation means to cool the infrared sensor, so as to provide relatively more accurate temperature measurement.

It is still another objective of the present invention to provide a method for manufacturing an infrared thermometer for ear or skin temperature that implements the heat dissipation means to cool the infrared sensor, so as to permit of temperature measurement with improved stability and less deviation during continuous use.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

This invention discloses an infrared thermometer for measuring ear or skin temperature. The technology of taking temperature by an infrared sensor is well known to people skilled in the art and will not be discussed in great detail herein. Meantime, the drawings are provided to illustrate the structure relating to the features of the present invention and are not necessarily drawn to scale.

Figure 1A:
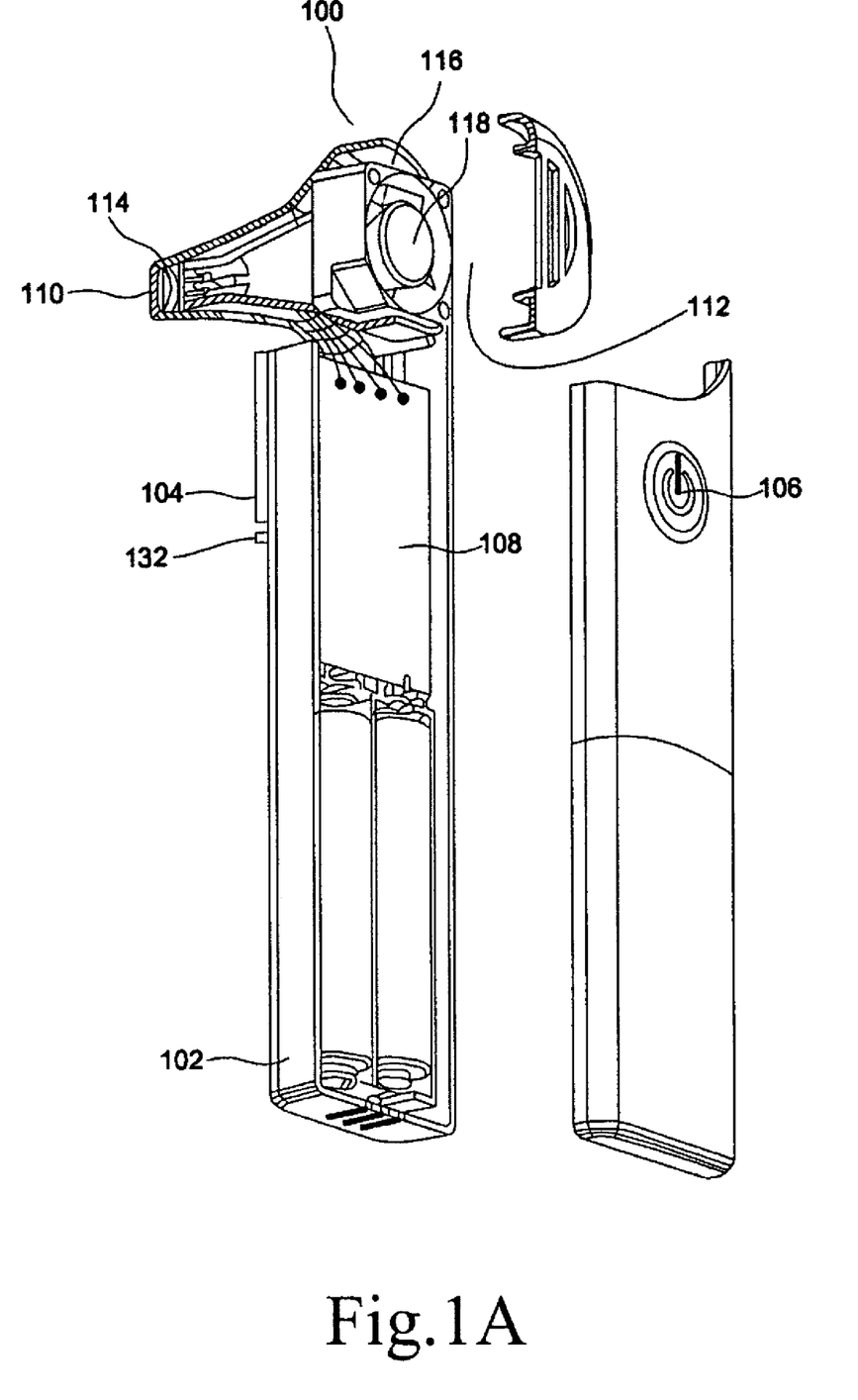
FIG. 1A is a structural drawing illustrating an infrared ear thermometer according to a first preferred embodiment of the present invention.
Figure 1B:
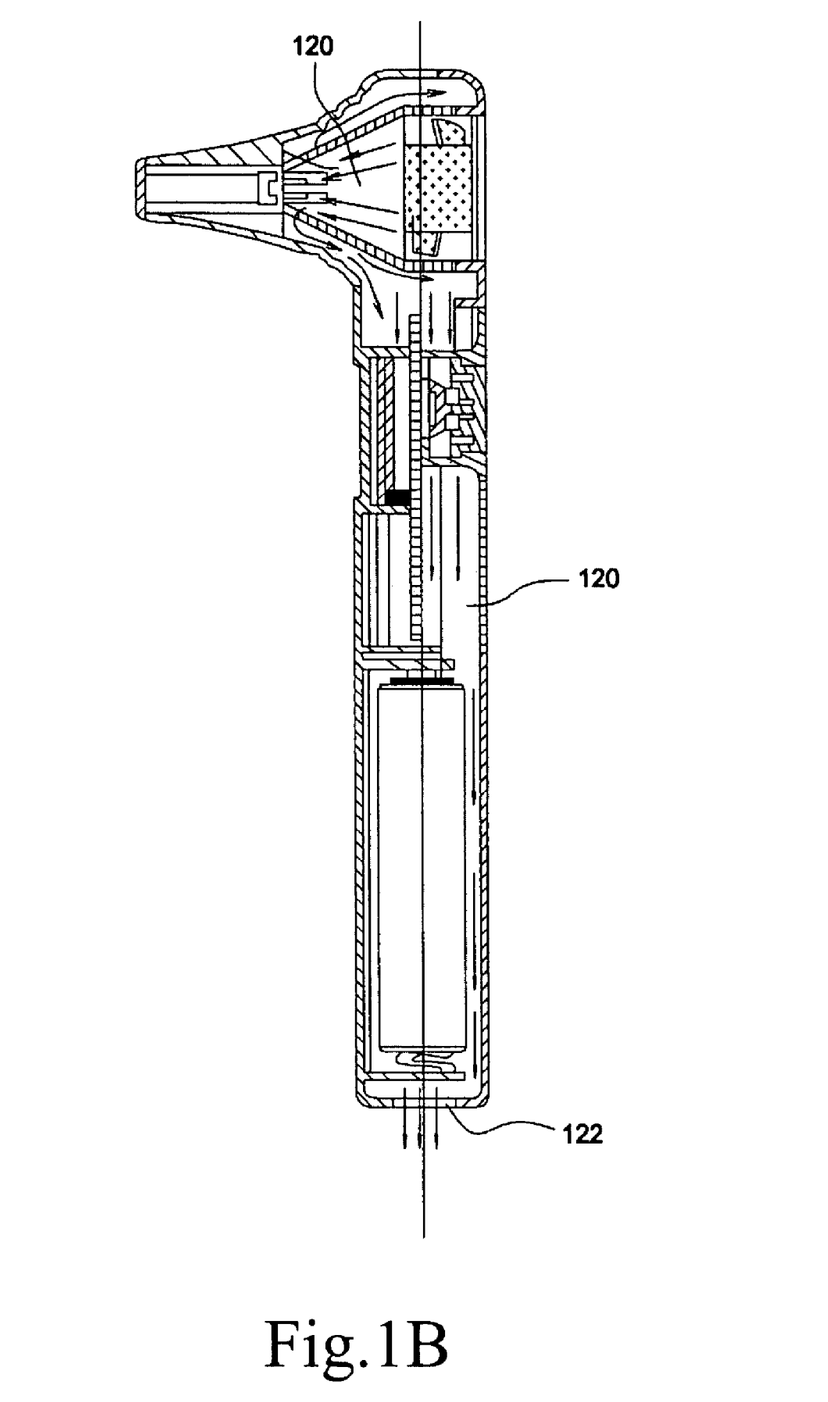
FIG. 1B is a cross sectional transverse view illustrating the infrared ear thermometer according to the first preferred embodiment of the present invention.
Figure 1C:
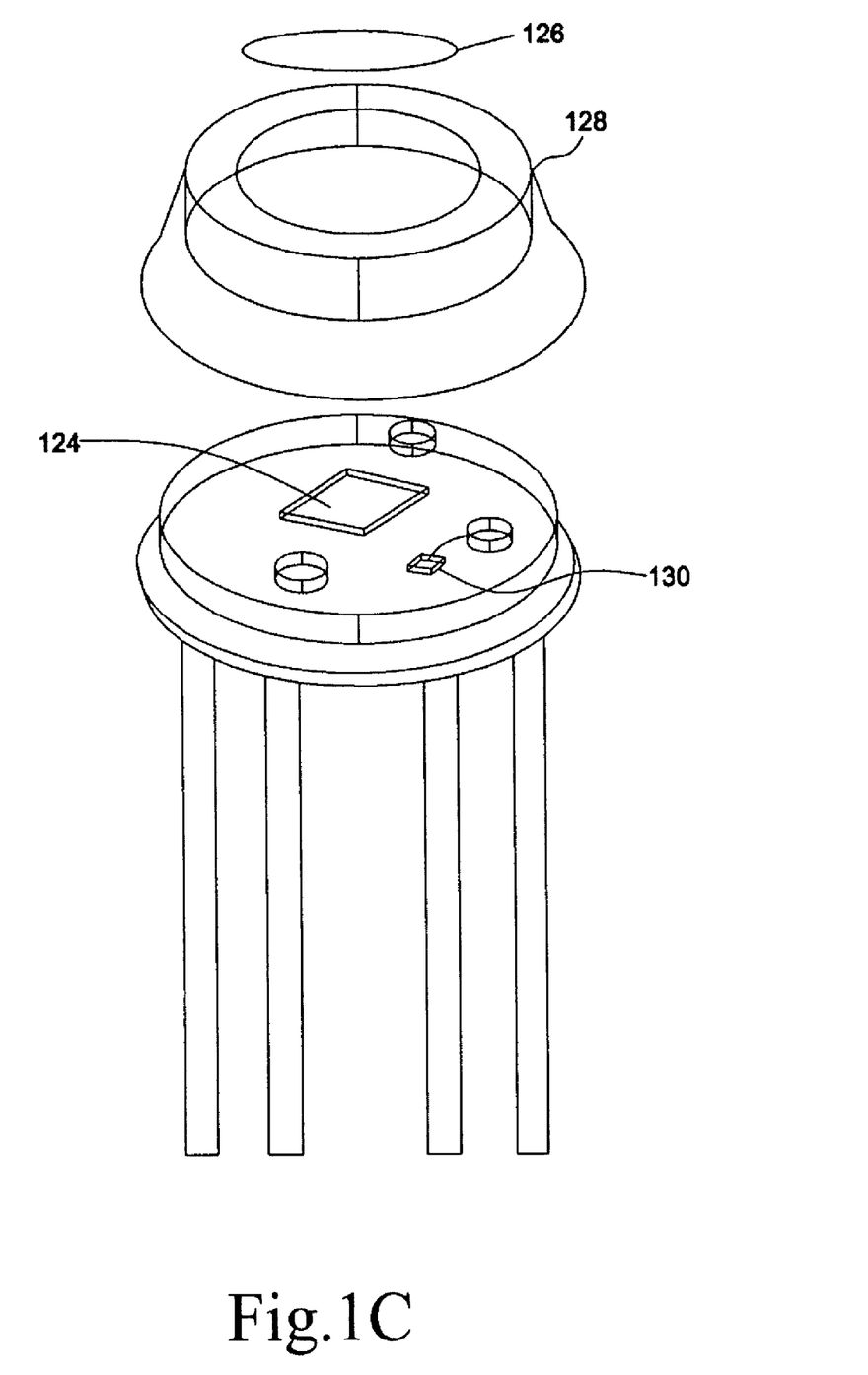
FIG. 1C is an exploded view illustrating an infrared sensor of the infrared ear thermometer according to the first preferred embodiment of the present invention.

Please refer to FIGS. 1A, 1B and 1C for an infrared ear thermometer according to a first preferred embodiment of the present invention.

The disclosed infrared ear thermometer 100 comprises a body, an infrared sensor 114, and a heat dissipating means 116.

The body comprises a housing 102, a display 104, a power switch 106, a control circuit 108, a protrudent first opening 110 and a second opening 112. The infrared sensor 114 is disposited near the protrudent first opening 110 in the body while the heat dissipation means 116 is deposited near the second opening 112 in the body. The infrared sensor 114 comprises a thermopile 124, a color filter 126, a metal cap 128 and a thermistor 130, wherein the thermopile 124 is composed of a plurality of coupled thermal couples. The thermistor 130 may be installed inside the thermopile 124, or, alternatively, installed outside the thermopile 124. The power switch 106 is provided for starting or shutting the power source of the infrared ear thermometer 100 and may be selected from a group consisting of a push-button switch, a touch switch, a vibration switch and a sensor switch.

When the power switch 106 of the infrared ear thermometer 100 is turned on, the thermistor 130 is actuated to measure the temperature variation of the thermopile 124. If the temperature variation of the thermopile 124 exceeds a predetermined level, the infrared ear thermometer 100 is now at an nonoperational state. Then the heat dissipation means 116 operates to urge the air flowing in and out of the body, so as to contribute air circulation and cooling. The heat dissipation means 116 stops automatically when the temperature variation of the thermopile 124 becomes lower than or equal to the predetermined level. At this time, since the temperature variation of the thermopile 124 is lower than or equal to the predetermined level, the infrared ear thermometer 100 is brought into an operational state and the display 104 presents a signal while a buzzer gives an alarm to inform a user of this operational state. Afterward, a trigger 132 can be triggered to start the infrared sensor 114 to conduct temperature measurement. Thereby, the infrared ear thermometer 100 permits of temperature measurement with improved stability and less deviation.

As for the disclosed infrared ear thermometer 100, said heat dissipation means 116 may be provided behind the infrared sensor 114, or, alternatively, behind and below the infrared sensor 114. Preferably, the heat dissipation means 116 is provided behind the infrared sensor 114. The heat dissipation means 116, the control circuit 108, the display 104, the power switch 106 and the infrared sensor 114 are mutually communicated. Therein, the display 104 may be selected from a group consisting of a liquid crystal display, an OLED display and a PLED display.

The heat dissipation means 116 comprises a fan 118, which is communicated with the infrared sensor 114 and the second opening 112 by means of an air channel 120. Thus, when the fan 118 operates, the air channel 120 allows the airflow to flow more smoothly therein. The air channel 120 comprises at least one inlet arranged behind the infrared sensor 114 or, alternatively, behind and below the infrared sensor 114. The air channel 120 further comprises at least one exit arranged at a second outlet 122 of the body.

In a second embodiment of the present invention, a method for manufacturing an infrared ear thermometer is disclosed and comprising the following steps:

(1) Providing a body 100 which comprises a housing 102, a display 104, a power switch 106, a control circuit 108, a protrudent first opening 110 and a second opening 112;

(2) Providing an infrared sensor 114, which is provided inside the body and near the first opening 110 wherein the infrared sensor 114 comprises a thermopile 124, a color filter 126, a metal cap 128 and a thermistor 130; and (3) Providing a heat dissipation means 116, which is provided inside the body and near the second opening 112.

In the present embodiment, the novel features of the body 100, the infrared sensor 114 and the heat dissipation means 116 are the same as those described in the first embodiment.

Figure 2A:
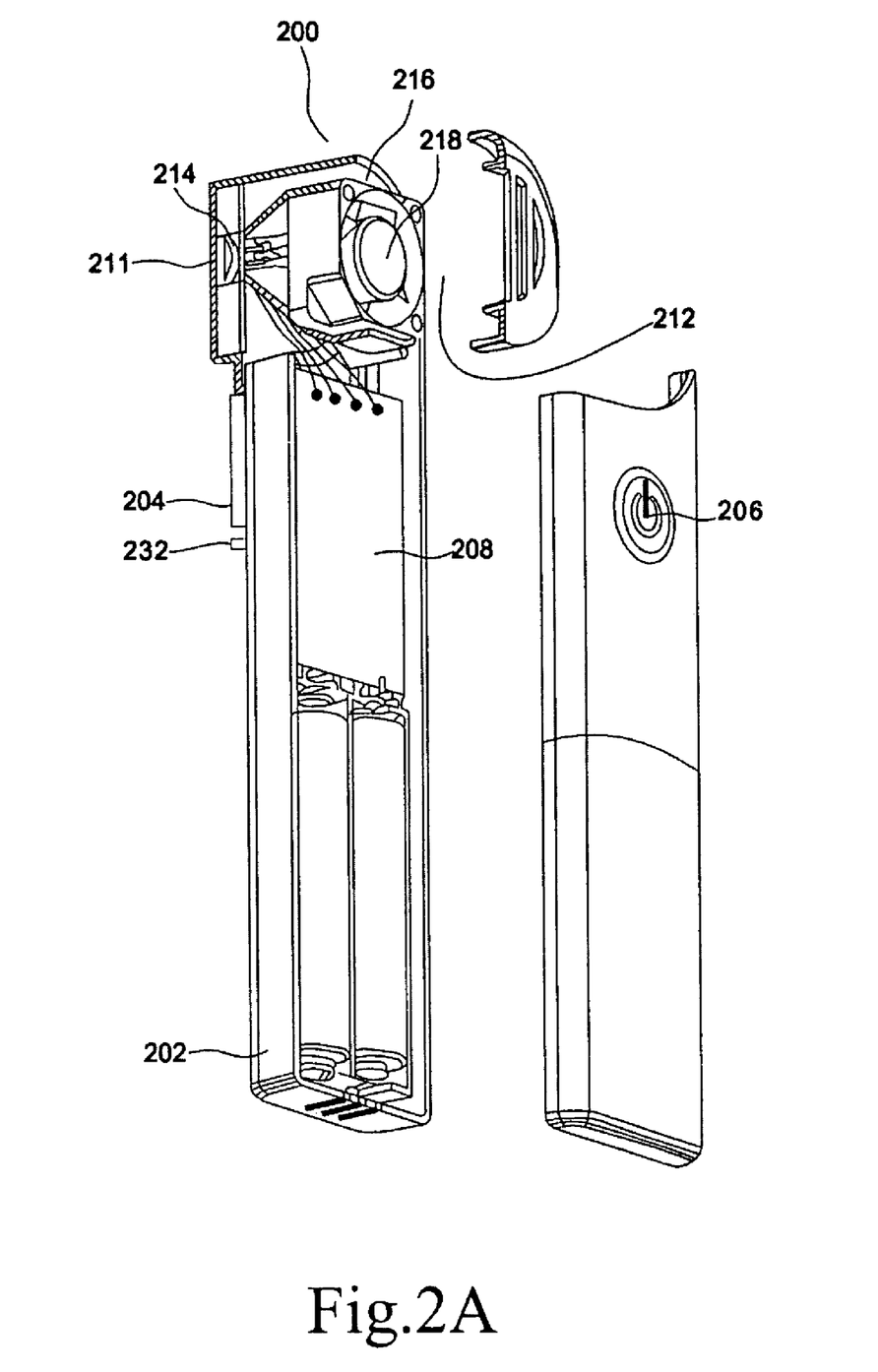
FIG. 2A is a structural drawing illustrating an infrared thermometer according to a third preferred embodiment of the present invention.
Figure 2B:
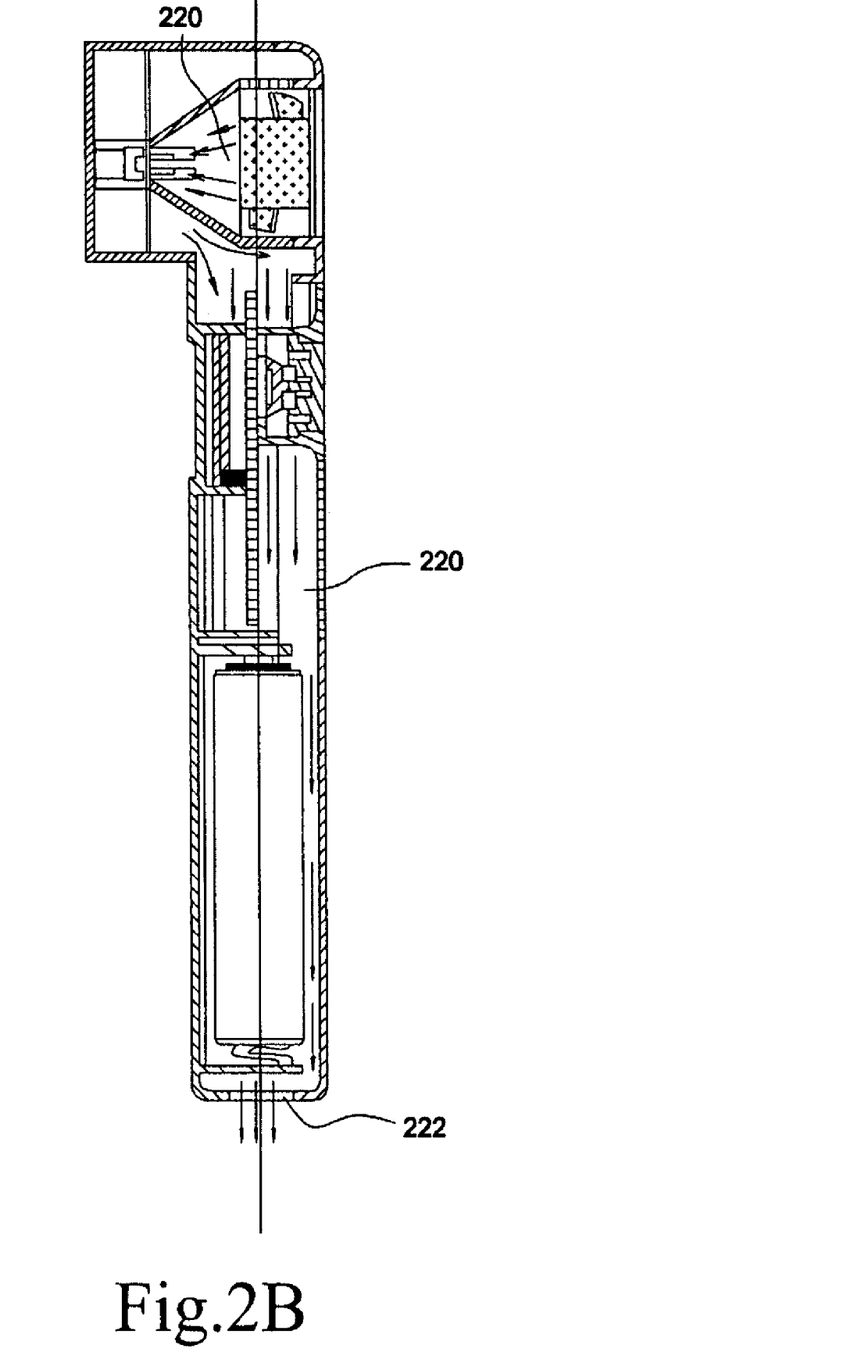
FIG. 2B is a cross sectional transverse view illustrating the infrared thermometer according to the third preferred embodiment of the present invention.
Figure 2C:
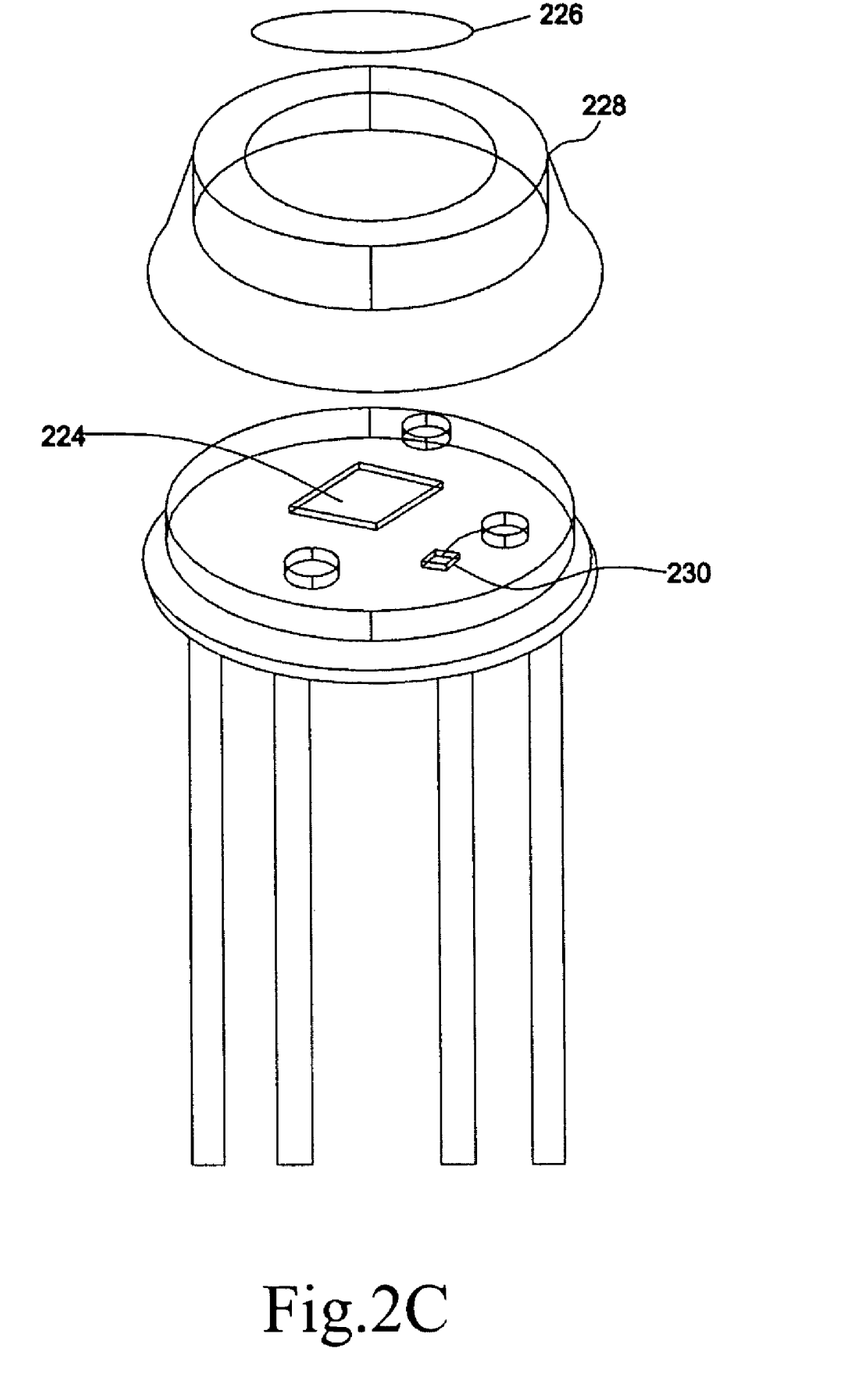
FIG. 2C is an exploded view illustrating an infrared sensor of the infrared ear thermometer according to the third preferred embodiment of the present invention.

Please see FIGS. 2A, 2B, and 2C, wherein an infrared thermometer according to a third embodiment of the present invention is depicted.

The disclosed infrared thermometer 200 comprises a body, an infrared sensor 214 and a heat dissipation means 216.

The body comprises a housing 202, a display 204, a power switch 206, a control circuit 208, a first opening 211 and a second opening 212. The infrared sensor 214 is positioned near the first opening 211 in the body while the heat dissipation means 216 is deposited near the second opening 212 in the body. The infrared sensor 214 comprises a thermopile 224, a color filter 226, a metal cap 228 and a thermistor 230, wherein the thermopile 224 is composed of a plurality of coupled thermal couples. The thermistor 230 may be installed inside the thermopile 224, or, alternatively, installed outside the thermopile 224. The power switch 206 is provided for starting or shutting the power source of the infrared thermometer 200 and may be selected from a group consisting of a push-button switch, a touch switch, a vibration switch and a sensor switch.

When the power switch 206 of the infrared thermometer 200 is turned on, the thermistor 230 is actuated to measure the temperature variation of the thermopile 224. If the temperature variation of the thermopile 224 exceeds a predetermined level, the infrared thermometer 200 is at an nonoperational state. Then the heat dissipation means 216 operates to urge the air flowing in and out of the body, so as to contribute air circulation and cooling. The heat dissipation means 216 stops automatically when the temperature variation of the thermopile 224 becomes lower than or equal to the predetermined level. At this time, since the temperature variation of the thermopile 224 is lower than or equal to the predetermined level, the infrared thermometer 200 is brought into an operational state and the display 204 presents a signal while a buzzer gives an alarm to inform a user of this operational state. Afterward, a trigger 232 can be triggered to start the infrared sensor 214 to conduct temperature measurement. Thereby, the infrared thermometer 200 permits of temperature measurement with improved stability and less deviation.

As for the disclosed infrared thermometer 200, said heat dissipation means 216 may be provided behind the infrared sensor 214, or, alternatively, behind and below the infrared sensor 214. Preferably, the heat dissipation means 216 is provided behind the infrared sensor 214. The heat dissipation means 216, the control circuit 208, the display 204, the power switch 206 and the infrared sensor 214 are mutually communicated. Therein, the display 204 may be selected from a group consisting of a liquid crystal display, an OLED display and a PLED display.

The heat dissipation means 216 comprises a fan 218, which is communicated with the infrared sensor 214 and the second opening 212 by means of an air channel 220. Thus, when the fan 218 operates, the air channel 220 allows the airflow to flow more smoothly therein. The air channel 220 comprises at least one inlet arranged behind the infrared sensor 214 or, alternatively, behind and below the infrared sensor 214. The air channel 220 further comprises at least one exit arranged at a second outlet 222 of the body.

In a fourth embodiment of the present invention, a method for manufacturing an infrared thermometer is disclosed and containing the following steps:

(1) Providing a body 200, which comprises a housing 202, a display 204, a power switch 206, a control circuit 208, a first opening 211 and a second opening 212;

(2) Providing an infrared sensor 214, which is provided inside the body and near the first opening 211 wherein the infrared sensor 214 comprises a thermopile 224, a color filter 226, a metal cap 228 and a thermistor 230; and (3) Providing a heat dissipation means 216, which is provided inside the body and near the second opening 212.

In the present embodiment, the novel features of the body 200, the infrared sensor 214 and the heat dissipation means 216 are the same as those described in the third embodiment.

Please refer to FIGS. 1A, 1B, and 1C wherein an infrared ear thermometer according to a fifth embodiment of the present invention is depicted.

The disclosed infrared ear thermometer 100 comprises a body, an infrared sensor 114 and a heat dissipation means 116.

The body comprises a housing 102, a display 104, a power switch 106, a control circuit 108, a protrudent first opening 110 and a second opening 112. The infrared sensor 114 is positioned near the protrudent first opening 110 in the body while the heat dissipation means 116 is deposited near the second opening 112 in the body. The infrared sensor 114 comprises a thermopile 124 and a thermistor 130, wherein the thermopile 124 is composed of a plurality of coupled thermal couples. The disclosed infrared ear thermometer 100 further comprises a trigger 132, which is provide to start the infrared sensor 114 to conduct temperature measurement when the infrared ear thermometer 100 is at its operational state. The power switch 106 is provided to start or shut the power source of the infrared ear thermometer 100 and may be selected from a group consisting of a push-button switch, a touch switch, a vibration switch and a sensor switch. When the power source is turned on, the heat dissipation means 116 operates to urge the air flowing in and out of the body, so as to contribute air circulation and cooling. Thereby, the infrared ear thermometer 100 permits of temperature measurement with improved stability and less deviation.

As for the disclosed infrared ear thermometer 100, said heat dissipation means 116 may be provided behind the infrared sensor 114, or, alternatively, behind and below the infrared sensor 114. Preferably, the heat dissipation means 116 is provided behind the infrared sensor 114. The heat dissipation means 116, the control circuit 108, the display 104, the power switch 106 and the infrared sensor 114 are mutually communicated. Therein, the display 104 may be selected from a group consisting of a liquid crystal display, an OLED display and a PLED display.

The heat dissipation means 116 comprises a fan 118, which is communicated with the infrared sensor 114 and the second opening 112 by means of an air channel 120. Thus, when the fan 118 operates, the air channel 120 allows the airflow to flow more smoothly therein. The air channel 120 comprises at least one inlet arranged behind the infrared sensor 114 or, alternatively, behind and below the infrared sensor 114. The air channel 120 further comprises at least one exit arranged at a second outlet 122 of the body.

In a sixth embodiment of the present invention, a method for manufacturing an infrared ear thermometer is disclosed and containing the following steps:

(1) Providing a body 100, which comprises a housing 102, a display 104, a power switch 106, a control circuit 108, a protrudent first opening 110 and a second opening 112;

(2) Providing an infrared sensor 114, which is provided inside the body and near the first opening 110 wherein the infrared sensor 114 comprises a thermopile 124 and a thermistor 130; and (3) Providing a heat dissipation means 116, which is provided inside the body and near the second opening 112 for urging the air flowing in and out of the body, so as to contribute air circulation.

In the present embodiment, the novel features of the body 100, the infrared sensor 114 and the heat dissipation means 116 are the same as those described in the fifth embodiment.

Please refer to FIGS. 2A, 2B, and 2C wherein an infrared thermometer according to a seventh embodiment of the present invention is depicted.

The disclosed infrared thermometer 200 comprises a body, an infrared sensor 214 and a heat dissipation means 216.

The body comprises a housing 202, a display 204, a power switch 206, a control circuit 208, a first opening 211 and a second opening 212. The infrared sensor 214 is positioned near the first opening 211 in the body while the heat dissipation means 216 is deposited near the second opening 212 in the body. The infrared sensor 214 comprises a thermopile 224 and a thermistor 230, wherein the thermopile 224 is composed of a plurality of coupled thermal couples. The infrared thermometer 200 further comprises a trigger 232, which is provide to start the infrared sensor 214 to conduct temperature measurement when the infrared thermometer 200 is at its operational state. The power switch 206 is provided to start or shut the power source of the infrared thermometer 200 and may be selected from a group consisting of a push-button switch, a touch switch, a vibration switch and a sensor switch. When the power source is turned on, the heat dissipation means 216 operates to urge the air flowing in and out of the body, so as to contribute air circulation and cooling. Thereby, the infrared thermometer 200 permits of temperature measurement with improved stability and less deviation.

As for the disclosed infrared thermometer 200, said heat dissipation means 216 may be provided behind the infrared sensor 214, or, alternatively, behind and below the infrared sensor 214. Preferably, the heat dissipation means 216 is provided behind the infrared sensor 214. The heat dissipation means 216, the control circuit 208, the display 204, the power switch 206 and the infrared sensor 214 are mutually communicated. Therein, the display 204 may be selected from a group consisting of a liquid crystal display, an OLED display and a PLED display.

The heat dissipation means 216 comprises a fan 218, which is communicated with the infrared sensor 214 and the second opening 212 by means of an air channel 220. Thus, when the fan 218 operates, the air channel 220 allows the airflow to flow more smoothly therein. The air channel 220 comprises at least one inlet arranged behind the infrared sensor 214 or, alternatively, behind and below the infrared sensor 214. The air channel 220 further comprises at least one exit arranged at a second outlet 222 of the body.

In an eighth embodiment of the present invention, a method for manufacturing an infrared ear thermometer is disclosed and containing the following steps:

(1) Providing a body 200, which comprises a housing 202, a display 204, a power switch 206, a control circuit 208, a first opening 211 and a second opening 212;

(2) Providing an infrared sensor 214, which is provided inside the body and near the first opening 211 wherein the infrared sensor 214 comprises a thermopile 224 and a thermistor 230; and (3) Providing a heat dissipation means 216, which is provided inside the body and near the second opening 212, so as to contribute air circulation.

In the present embodiment, the novel features of the body 200, the infrared sensor 214 and the heat dissipation means 216 are the same as those described in the seventh embodiment.

Although the particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. An infrared ear thermometer comprising:
a body, which comprises a housing (102), a display (104), a power switch (106), a control circuit (108), a protrudent first opening (110), a second opening (112) and a second outlet (122); and
an infrared sensor (114), which is provided inside the body and near the protrudent first opening (110) and comprises a thermopile (124), a color filter (126), a metal cap (128) and a thermistor (130);
said infrared ear thermometer characterized in:
a heat dissipation means (116), which is provided inside the body and comprises a fan (118) and an air channel (120), said fan (118) is provided near the second opening (112), said air channel (120) comprises at least one inlet which provided behind said infrared sensor (114) and an exit which provided at said second outlet (122); so that when the power switch (106) is turned on, the thermistor (130) is actuated to measure the temperature variation of the thermopile (124), wherein when the temperature variation of the thermopile (124) exceeds a predetermined level, the heat dissipation means (116) operates, the fan (118) urges the outside air flowing in and cooling said infrared sensor (114), then flowing out of the body via said air channel (120), and the heat dissipation means (116) shuts when the temperature variation of the thermopile (124) becomes lower than or equal to the predetermined level, wherein when the temperature variation of the thermopile (124) is lower than or equal to the predetermined level, the infrared ear thermometer is at an operational state while when the temperature variation of the thermopile (124) is higher than the predetermined level, the infrared ear thermometer is at an non-operational state.

2. The infrared ear thermometer of claim 1, wherein the display presents a signal to inform a user when the infrared ear thermometer is at the operational state.

3. The infrared ear thermometer of claim 1, further comprising a buzzer for giving an alarm to inform a user when the infrared ear thermometer is at the operational state.

4. The infrared ear thermometer of claim 1, wherein the power switch is selected from a group consisting of a push-button switch, a touch switch, a vibration switch and a sensor switch.

5. The infrared ear thermometer of claim 1, further comprising a trigger for starting the infrared sensor to conduct temperature measurement when the infrared ear thermometer is at the operational state.

6. A method for manufacturing an infrared ear thermometer comprising:
providing a body which comprises a housing (102), a display (104), a power switch (106), a control circuit (108), a protrudent first opening (110), a second opening (112) and a second outlet (122);
providing an infrared sensor (114), which is provided inside the body and near the protrudent first opening (110) wherein the infrared sensor (114) comprises a thermopile (124), a color filter (126), a metal cap (128) and a thermistor (130); and
providing a heat dissipation means (116), which is provided inside the body and comprises a fan (118) and an air channel (120), said fan (118) is provided near the second opening (112), said air channel (120) comprises at least one inlet which provided behind said infrared sensor (114) and an exit which provided at said second outlet (122);
so that when the power switch (106) is turned on, the thermistor (130) is actuated to measure the temperature variation of the thermopile (124), wherein when the temperature variation of the thermopile (124) exceeds a predetermined level, the heat dissipation means (116) operates, the fan (118) urges the outside air flowing in and cooling said infrared sensor (114), then flowing out of the body via said air channel (120), and the heat dissipation means (116) shuts when the temperature variation of the thermopile (124) becomes lower than or equal to the predetermined level, wherein when the temperature variation of the thermopile (124) is lower than or equal to the predetermined level, the infrared ear thermometer is at an operational state while when the temperature variation of the thermopile (124) is higher than the predetermined level, the infrared ear thermometer is at an nonoperational state.

7. An infrared thermometer comprising:

a body, which comprises a housing (202), a display (204), a power switch (206), a control circuit (208), a first opening (210), a second opening (212) and a second outlet (222); and an infrared sensor (214), which is provided inside the body and near the first opening (210) wherein the infrared sensor (214) comprises a thermopile (224), a color filter (226), a metal cap (228) and a thermistor (230);

said infrared thermometer characterized in:

a heat dissipation means (216), which is provided inside the body and comprises a fan (218) and an air channel (220), said fan (218) is provided near the second opening (212), said air channel (220) comprises at least one inlet which provided behind said infrared sensor (214) and an exit which provided at said second outlet (222); so that when the power switch (206) is turned on, the thermistor (230) is actuated to measure the temperature variation of the thermopile (224), wherein when the temperature variation of the thermopile (224) exceeds a predetermined level, the heat dissipation means (216) operates, the fan (218) urges the outside air flowing in and cooling said infrared sensor (214), then flowing out of the body via said air channel (220), and the heat dissipation means (216) shuts when the temperature variation of the thermopile (224) becomes lower than or equal to the predetermined level, wherein when the temperature variation of the thermopile (224) is lower than or equal to the predetermined level, the infrared ear thermometer is at an operational state while when the temperature variation of the thermopile (224) is higher than the predetermined level, the infrared ear thermometer is at an nonoperational state.

8. The infrared thermometer of claim 7, wherein the display presents a signal to inform a user when the infrared thermometer is at the operational state.

9. The infrared thermometer of claim 7, further comprising a buzzer for giving an alarm to inform a user when the infrared thermometer is at the operational state.

10. The infrared thermometer of claim 7, wherein the power switch is selected from a group consisting of a push-button switch, a touch switch, a vibration switch and a sensor switch.

11. The infrared thermometer of claim 7, further comprising a trigger for starting the infrared sensor to conduct temperature measurement when the infrared thermometer is at the operational state.

12. A method for manufacturing an infrared thermometer comprising:

providing a body which comprises a housing (202), a display (204), a power switch (206), a control circuit (208), a first opening (210), a second opening (212) and a second outlet (222), wherein the power switch (206) is selected from a group consisting of a push-button switch, a touch switch, a vibration switch and a sensor switch;

providing an infrared sensor (214), which is provided inside the body and near the first opening (210) wherein the infrared sensor (214) comprises a thermopile (224), a color filter (226), a metal cap (228) and a thermistor (230); and providing a heat dissipation means (216), which is provided inside the body and comprises a fan (218) and an air channel (220), said fan (218) is provided near the second opening (212), said air channel (220) comprises at least one inlet which provided behind said infrared sensor (214) and an exit which provided at said second outlet (222);

wherein when the power switch (206) is turned on, the thermistor (230) is actuated to measure the temperature variation of the thermopile (224), wherein when the temperature variation of the thermopile (224) exceeds a predetermined level, the heat dissipation means (216) operates, the fan 218 urges the outside air flowing in and cooling said infrared sensor (214), then flowing out of the body via said air channel (220), and the heat dissipation means (216) shuts when the temperature variation of the thermopile (224) becomes lower than or equal to the predetermined level, wherein when the temperature variation of the thermopile (224) is lower than or equal to the predetermined level, the infrared ear thermometer is at an operational state while when the temperature variation of the thermopile (224) is higher than the predetermined level, the infrared ear thermometer is at an nonoperational state.

* * * * *

UNITED STATES PATENT AND TRADEMARK OFFICE
CERTIFICATE OF CORRECTION

PATENT NO.           : 7,665,892 B2                                                        Page 1 of 1
APPLICATION NO.      : 11/812020
DATED                : February 23, 2010
INVENTOR(S)          : Chih-Wei Hsieh It is certified that error appears in the above-identified patent and that said Letters Patent is hereby corrected as shown below:

Title Page 1, "Foreign Application Priority Data Apr. 27, 2007 (CN) ................. 96115038" should read
-- Foreign Application Priority Data Apr. 27, 2007 (TW) ................. 096115038 --

Signed and Sealed this

First Day of June, 2010

David J. Kappos
*Director of the United States Patent and Trademark Office*